US012220767B2

(12) United States Patent
Matsui et al.

(10) Patent No.: US 12,220,767 B2
(45) Date of Patent: Feb. 11, 2025

(54) CONTROL DEVICE AND CONTROL METHOD FOR ADDITIVE MANUFACTURING SYSTEM

(71) Applicant: Mitsubishi Electric Corporation, Tokyo (JP)

(72) Inventors: Yoshiyuki Matsui, Tokyo (JP); Nobuyuki Sumi, Tokyo (JP); Shun Kayashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/712,994

(22) PCT Filed: Feb. 25, 2022

(86) PCT No.: PCT/JP2022/007947
§ 371 (c)(1),
(2) Date: May 23, 2024

(87) PCT Pub. No.: WO2023/162156
PCT Pub. Date: Aug. 31, 2023

(65) Prior Publication Data
US 2024/0416454 A1 Dec. 19, 2024

(51) Int. Cl.
*B23K 26/342* (2014.01)
*B23K 26/082* (2014.01)
(Continued)

(52) U.S. Cl.
CPC .......... *B23K 26/342* (2015.10); *B23K 26/082* (2015.10); *B23K 31/02* (2013.01); *B33Y 50/02* (2014.12)

(58) Field of Classification Search
CPC .... B23K 26/342; B23K 31/02; B23K 26/082; B33Y 50/02
(Continued)

(56) References Cited

U.S. PATENT DOCUMENTS

| 2018/0141121 A1* | 5/2018 | Niitani | G01J 5/004 |
| 2021/0141787 A1* | 5/2021 | Shimizu | G06F 16/248 |

(Continued)

FOREIGN PATENT DOCUMENTS

| CN | 106735210 A | 5/2017 |
| JP | 2006-281282 A | 10/2006 |

(Continued)

OTHER PUBLICATIONS

International Search Report and Written Opinion mailed on May 17, 2022, received for PCT Application PCT/JP2022/007947, filed on Feb. 25, 2022, 8 pages including English Translation.

(Continued)

*Primary Examiner* — Mohammad Ali
*Assistant Examiner* — Joshua T Sanders
(74) *Attorney, Agent, or Firm* — XSENSUS LLP

(57) ABSTRACT

A control device controls at least one of: power of a heat source; or a scanning speed of the heat source and a material feed speed of feedstock. The control device includes a processing condition output unit, a heat source power addition unit, a molten pool state error calculation unit, and a speed adjustment unit. The output unit outputs values of the power of the heat source, the scanning speed, and the feed speed. The addition unit outputs a post-addition value of the power of the heat source to the processing condition output unit when a molten pool state error is less than a predetermined threshold and the value of the power of the heat source is less than maximum power of the heat source. The calculation unit calculates the error. The adjustment unit adjusts the scanning speed and the feed speed based on the error.

14 Claims, 11 Drawing Sheets

(51) Int. Cl.
*B23K 31/02* (2006.01)
*B33Y 50/02* (2015.01)

(58) Field of Classification Search
USPC .......................................... 700/98
See application file for complete search history.

(56) References Cited

U.S. PATENT DOCUMENTS

2022/0143928 A1    5/2022  Uozumi et al.
2022/0334553 A1*  10/2022  Shinozaki ............. G06N 20/00

FOREIGN PATENT DOCUMENTS

| JP | 2007-268570 A |   | 10/2007 |
|----|---------------|---|---------|
| JP | 2016198805 A  | * | 12/2016 |
| JP | 2019-112677 A |   | 7/2019  |
| JP | 2021-037716 A |   | 3/2021  |
| WO | 2017/163429 A1 |   | 9/2017  |
| WO | 2020/261386 A1 |   | 12/2020 |

OTHER PUBLICATIONS

Decision to Grant a Patent mailed on Aug. 2, 2022, received for JP Application 2022-538209, 5 pages including English Translation.
Office Action mailed on Nov. 12, 2024 for the corresponding Chinese patent application No. 202280084094.8 1 and an English machine translation thereof, 16pp.

* cited by examiner

CONTROL DEVICE AND CONTROL METHOD FOR ADDITIVE MANUFACTURING SYSTEM

CROSS-REFERENCE TO RELATED APPLICATION

This application is a national stage application, pursuant to 35 U.S.C. § 371, of International Patent Application No. PCT/JP2022/007947, filed Feb. 25, 2022, the entire contents of which are incorporated herein by reference.

FIELD

The present disclosure relates to a control device and a control method for an additive manufacturing system that adds a material onto a workpiece to produce an object.

BACKGROUND

A known method for producing a three-dimensional object is additive manufacturing (AM). One of techniques of additive manufacturing is a directed energy deposition (DED) technique, in which a beam is emitted to a workpiece and a material is fed to an irradiation position to thereby melt the material to build an object.

Forms of materials fed in a DED technique are roughly classified into a wire form and a powder form. Such materials are fed into a molten pool generated on the workpiece by a heat source such as beam irradiation, thereby melting the material. Concurrently with the feed of the material, the irradiation position is scanned, such that material at a location no longer having heat input thereto solidifies into a bead. Iteration of such bead formation in the height direction results in production of a three-dimensional object.

Additive manufacturing processing of a DED technique using laser beam irradiation suffers from higher heat accumulation in the object with the larger number of stacked layers. With a constant laser output power (hereinafter, simply laser power), heat input to a location having high heat accumulation is excessive, which causes the drooping of material, excessive bead width, etc. This leads to a problem of decrease in building accuracy. It is, however, difficult to set a lower laser power, estimating the amount of heat accumulation in advance because the degree of heat accumulation depends on the kind of material to feed, the kind of workpiece material, the shape to build, and the number of stacked layers. To address this, feedback control technique, which senses the shape, the width, etc. of the molten pool and adjusts the laser power to control the amount of heat input, is therefore often used. Although another known method is to increase the scanning speed to decrease the amount of heat input per unit distance, the laser power provides molten pools with higher responsiveness to commands and is easier to control as well than the scanning speed. For this reason, in many cases, the laser power is controlled as a target to manipulate.

Patent Literature 1 discloses a technology of additive manufacturing using a laser-based, powder-based DED technique that captures an image of the molten pool, detects the width or shape of the molten pool from the captured image, and controls, on the basis of the detected width or shape, at least one of the output power and the scanning speed of a light beam such as a laser beam. This makes it possible to form a high-accuracy three-dimensional stacked layers.

Patent Literature 2 discloses additive manufacturing with a DED technique, in which a temperature of accumulated heat is extracted from measured surface temperature data on a workpiece, and a stacking condition is changed based on a buildable volume calculated from the extracted temperature of accumulated heat. The term stacking condition as used herein refers to the stacked layer height, the stacked layer width, the output power value, the amount of supply, and the speed.

CITATION LIST

Patent Literature

Patent Literature 1: WO 2017/163429 A
Patent Literature 2: WO 2020/261386 A

SUMMARY OF INVENTION

Problem to be Solved by the Invention

For the technology described in Patent Literature 1, a camera or an optical sensor detects the width or shape of a molten pool, and feedback control is performed on processing conditions such that the value of this detection data matches a target value. Under that feedback control, the heat source power is decreased as the number of stacked layers of shaping beads is increased with an increase in the amount of heat accumulation. This is a cause of a problem of high likelihood that the heat source output device incorporated fails to make full use of its capability. For the technology of Patent Literature 1, moreover, when the scanning speed is increased under the feedback control, the amount of feed of material per unit area is decreased because of a constant material feed speed. Thus, the bead height is reduced with the increase in the scanning speed, which is a cause of a problem of a decrease in building accuracy. The technology described in Patent Literature 2, which changes a stacking condition on the basis of the temperature of accumulated heat of a workpiece, changes the stacking condition so as to reduce the stacked layer volume on a high-temperature heat accumulated portion of the workpiece. This causes a problem of decrease in building speed with an increase in the degree of heat accumulation.

The present disclosure has been made in view of the foregoing, and it is an object of the present disclosure to provide an additive manufacturing system with a control device designed not only to increase building accuracy and building speed, but also to make it less likely for the heat source output device to fail to make full use of its capacity even when the number of stacked layers of built beads is increased, as compared to conventional technologies.

Means to Solve the Problem

To solve the problem and achieve the object described above, the present disclosure is directed to a control device for an additive manufacturing system to emit a heat source onto feedstock fed onto a workpiece to melt and solidify the feedstock into beads, and build an object by stacking the beads on the workpiece, the control device controlling, on a basis of molten pool state measurement information, at least one of: power of the heat source; or a scanning speed of the heat source and a material feed speed of the feedstock, the molten pool state measurement information being a value obtained by measurement of a state of a molten pool, the molten pool being the melted feedstock. The control device comprising: a processing condition output unit, a heat source power addition unit, a molten pool state error calculation unit, and a speed adjustment unit. The processing condition output unit outputs values of the power of the heat source, the scanning speed of the heat source, and the material feed speed to the additive manufacturing system. The heat source power addition unit outputs a post-addition value of the power of the heat source to the processing condition output unit when a molten pool state error is less than a predetermined threshold and the value of the power of the heat source output from the processing condition output unit is less than maximum power of the heat source, the post-addition value being a value of the power of the heat source having a predetermined addition value added, the molten pool state error being a difference between molten pool state target information and the molten pool state measurement information, the molten pool state target information being a targeted value of the state of the molten pool. The molten pool state error calculation unit calculates the molten pool state error from a captured image of the state of the molten pool. The speed adjustment unit adjusts the scanning speed of the heat source and the material feed speed on the basis of the molten pool state error.

Effects of the Invention

A control device for an additive manufacturing system according to the present disclosure provides an advantage of not only increasing the building accuracy and the building speed but also making it less likely that the heat source output device fails to make full use of its capability even when the number of stacked layers of built beads is increased, as compared to the conventional technologies.

DESCRIPTION OF EMBODIMENTS

A control device and a control method for an additive manufacturing system according to embodiments of the present disclosure will be described in detail below with reference to the drawings.

First Embodiment

Figure 1:
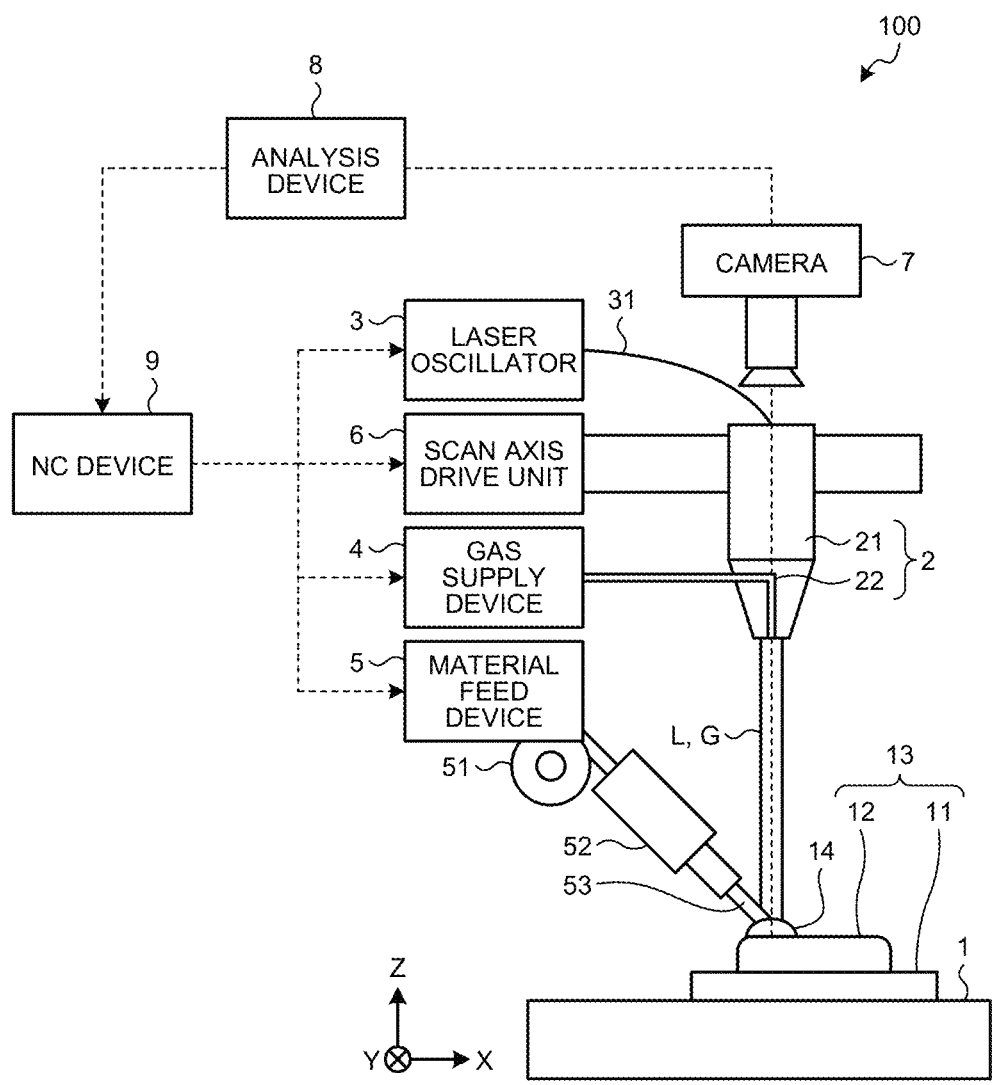
FIG. 1 is a schematic diagram illustrating an example of configuration of an additive manufacturing system according to a first embodiment.

FIG. 1 is a schematic diagram illustrating an example of configuration of an additive manufacturing system according to a first embodiment. An additive manufacturing system 100 is an additive manufacturing system that employs a directed energy deposition (DED) technique for producing an object 12 by emitting a heat source onto feedstock 53 fed onto a workpiece 13, such that the feedstock melts and solidifies into beads and the beads are stacked on the workpiece 13. The heat source may be an electric arc, a laser beam L, an electron beam, or the like. The following description is made assuming that the heat source is the laser beam L by way of example.

The additive manufacturing system 100 includes a stage 1, a processing head 2, a laser oscillator 3, a gas supply device 4, a material feed device 5, a scan axis drive unit 6, a camera 7, an analysis device 8, and a numerical control (NC) device 9.

The stage 1 is a member for placing and fixing a substrate 11 thereon. The object 12 is formed on the substrate 11. The workpiece 13 includes the substrate 11 and the object 12 formed on the substrate 11.

The processing head 2 emits the laser beam L to a processing point at which to melt the feedstock 53. The processing head 2 includes a beam nozzle 21 for emitting the laser beam L to the processing point and a gas nozzle 22 for injecting a shield gas G to the processing point.

The processing point, which is the irradiation position of the laser beam L, is the area where the feedstock 53 is added. The processing point moves along a processing path during the additive processing process.

The laser oscillator 3 oscillates the laser beam L, which is the heat source. The laser oscillator 3 is connected to the beam nozzle 21 via a fiber cable 31. The laser beam L oscillated by the laser oscillator 3 propagates through the fiber cable 31 to the beam nozzle 21 of the processing head 2. The laser beam L is then emitted from the tip of the beam nozzle 21. The laser oscillator 3 is an example of the heat source generation device for generating the heat source.

The gas supply device 4 injects the shield gas G from a gas supply source (not illustrated) through the gas nozzle 22 to the processing point. An example of the gas supply source is a gas cylinder. The gas supply source is connected to the gas nozzle 22 via a pipe. The gas supply device 4 is capable of changing the flow rate of the shield gas G on the basis of a command value from the NC device 9. The shield gas G has a function of reducing or preventing oxidization at a vicinity of the processing point and air-cooling the object 12. Thus, the shield gas G is desirably inert gas such as argon gas.

The material feed device 5 feeds the feedstock 53 toward the irradiation position of the laser beam L, i.e., the processing point, on the workpiece 13. The material feed device 5 includes a material feed source 51 and a material feed nozzle 52. The material feed nozzle 52 feeds, to the processing point, the feedstock 53 fed from the material feed source 51. In the first embodiment, the feedstock 53 is in a wire form. FIG. 1 illustrates an example of a side feed type, in which case the feedstock 53 is fed from the material feed nozzle 52 disposed obliquely above the processing point. Instead of a side feed type, the material feed device 5 may be of a center feed type, in which case the feedstock 53 is fed from the material feed nozzle 52 disposed directly above the processing point. The material feed device 5, which is actuated by servomotors (not illustrated), is thus capable of arbitrarily changing the material feed speed of the feedstock 53 on the basis of a command value from the NC device 9.

The scan axis drive unit 6 moves the processing head 2 and the material feed device 5 in an X-axis direction, a Y-axis direction, and a Z-axis direction. The X-axis, the Y-axis, and the Z-axis are perpendicular to one another. The X-axis and the Y-axis are horizontal axes, and the Z-axis is a vertical axis. In addition, the Z-axis is defined as being positive in the vertically upward direction. An example of the scan axis drive unit 6 is a set of a servomotor (not illustrated) for moving the processing head 2 and the material feed device 5 in the X-axis direction, a servomotor (not illustrated) for moving the processing head 2 and the material feed device 5 in the Y-axis direction, and a servomotor (not illustrated) for moving the processing head 2 and the material feed device 5 along the Z-axis direction. Operation of these servomotors enables the irradiation position of the laser beam L and the feed position of the feedstock 53 to move to any position within the stroke range.

The camera 7, which is an imaging device in the Z-axis positive direction coaxial with the laser beam L, captures an image of an area including the processing point. In one example, the camera 7 captures an image of appearance at the processing point, and outputs the captured image at the processing point to the analysis device 8.

The analysis device 8 analyzes the image at the processing point input from the camera 7, and detects a molten pool width defined as the width of a molten pool 14.

The analysis device 8 outputs the detected molten pool width, i.e., a measured molten pool width to the NC device 9. This makes it possible to obtain the molten pool width in real time during the building process. As used herein, the molten pool 14 refers to a mass of molten metal formed from the workpiece 13 and the feedstock 53 melted by irradiation with the laser beam L. The molten pool width is an example of molten pool state information. The molten pool state information is a value representing a state of the molten pool 14. The measured molten pool width corresponds to molten pool state measurement information.

The NC device 9 controls the additive manufacturing system 100 according to a processing program and processing conditions. In this respect, the processing program includes descriptions of a move command and a speed command. The move command is a command for moving the processing head 2 and the material feed device 5 along a preset path. The speed command is a command for a speed along a preset scan axis. The processing conditions are a set of the height and width of a bead to be formed and information necessary to provide such a height and width. The information necessary to form a bead includes the laser power, the scanning speed of the laser beam L, the material feed speed, and the gas flow rate. The NC device 9 controls the scan axis drive unit 6 to thereby move the processing head 2 and the material feed device 5 along a movement path indicated by the processing program. The NC device 9 also provides each of the laser oscillator 3, the material feed device 5, and the gas supply device 4 with an associated one of commands of the laser power, the scanning speed, the material feed speed, and the gas flow rate that have been preset according to the processing conditions. The NC device 9 corresponds to a control device for controlling the additive manufacturing system 100. In addition, in the first embodiment, the NC device 9 is a control device that controls at least one of: the power of the laser beam L; and the scanning speed of the laser beam L and the material feed speed of the feedstock 53, on the basis of the molten pool state measurement information. The laser beam L is the heat source. The molten pool state measurement information is a value obtained by measurement of the state of the molten pool 14 formed of the melted feedstock 53.

The NC device 9 may be one of components of the additive manufacturing system 100, or a device external to the additive manufacturing system 100.

An overview of operation of the additive manufacturing system 100 will now be described. After the substrate 11 is fixed on the stage 1, the NC device 9 operates the laser oscillator 3, the scan axis drive unit 6, the gas supply device 4, and the material feed device 5. That is, the NC device 9 controls the scan axis drive unit 6 on the basis of the processing program. The scan axis drive unit 6 moves the processing head 2 and the material feed device 5 along a movement path indicated by the processing program. The NC device 9 also controls the laser oscillator 3, the material feed device 5, and the gas supply device 4 on the basis of the processing conditions. Thus, the feedstock 53 is fed to the processing point, the laser beam L is emitted from the laser oscillator 3 through the processing head 2 to the processing point, and the shield gas G is injected to the processing point. The emitted laser beam L forms the molten pool 14 on the workpiece 13. Upon movement of the processing head 2 and the material feed device 5 along the movement path, the irradiation position of the laser beam L and the material feed position move, such that the melted feedstock 53 on the movement path solidifies into a bead.

Figure 2:
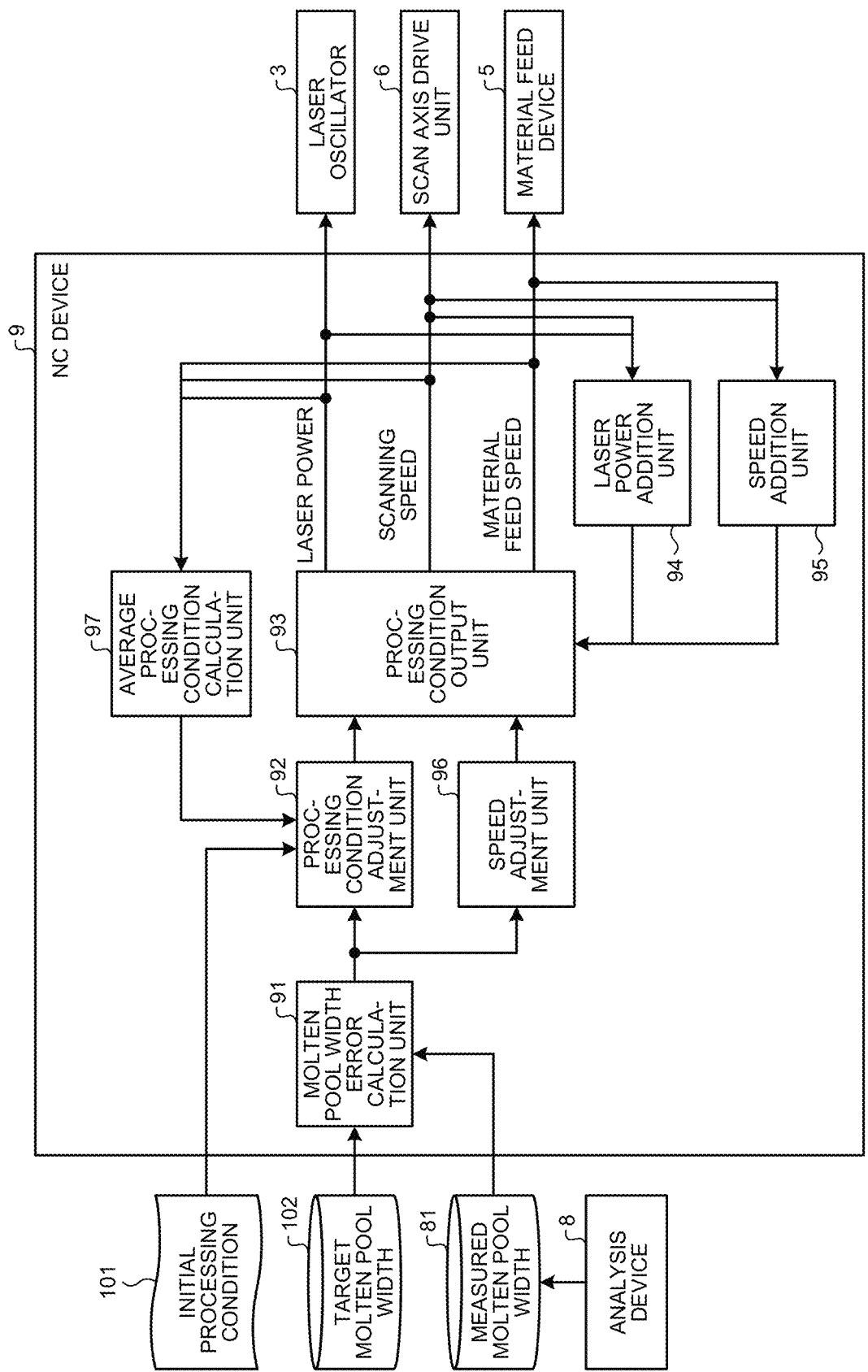
FIG. 2 is a block diagram illustrating an example of functional configuration of an NC device included in the additive manufacturing system according to the first embodiment.

Functionality of the NC device 9 will next be described. FIG. 2 is a block diagram illustrating an example of functional configuration of the NC device of the additive manufacturing system according to the first embodiment. In FIG. 2, the NC device 9 is given an initial processing condition 101 including initial values of the power of the heat source (i.e., the laser power), the scanning speed, the material feed speed, and the gas flow rate. The NC device 9 also receives a target molten pool width 102 and a measured molten pool width 81. The target molten pool width 102 has been set by a user, and the measured molten pool width 81 has been obtained by the analysis device 8. The target molten pool width 102 is the width of the molten pool 14 desired to be achieved through control, and can be set to any value by the user. The target molten pool width 102 corresponds to molten pool state target information. As the first embodiment is based on the assumption that the molten pool width is equal to the width of a formed bead, the value set as the target molten pool width 102 is the bead width that the user desires to achieve. In addition, the measured molten pool width 81 is the width of the molten pool 14 detected by the analysis device 8 from an image captured by the camera 7. As the image capturing by the camera 7 and the detection by the analysis device 8 are performed in turn during the building process, a value of the measured molten pool width 81 obtained in real time in the building process is input to the NC device 9. In one example, the initial processing condition data 101 and the target molten pool width 102 are stored in a storage unit provided inside or outside the NC device 9.

The NC device 9 includes a molten pool width error calculation unit 91, a processing condition adjustment unit 92, a processing condition output unit 93, a laser power addition unit 94, a speed addition unit 95, a speed adjustment unit 96, and an average processing condition calculation unit 97.

The molten pool width error calculation unit 91 calculates a molten pool width error from a difference between the target molten pool width 102 and the measured molten pool width 81. The molten pool width error is an error between the target molten pool width 102 and the measured molten pool width 81. The molten pool width error calculation unit 91 outputs the calculated molten pool width error to the processing condition adjustment unit 92. The molten pool width error corresponds to a molten pool state error. The molten pool width error calculation unit 91 corresponds to a molten pool state error calculation unit that calculates the molten pool state error from an image obtained by imaging the state of the molten pool 14.

The processing condition adjustment unit 92 receives the molten pool width error. When the molten pool width error is greater than a predetermined threshold, the processing condition adjustment unit 92 adjusts the processing conditions such that the molten pool width error becomes equal to or less than the set threshold. When a bead, i.e., a first object layer is to be formed on the substrate 11, the processing condition adjustment unit 92 outputs the initial processing condition 101 to the processing condition output unit 93. That is, the NC device 9 performs processing under the initial processing condition 101. The processing condition adjustment unit 92 then determines whether the molten pool width error obtained by real-time observation of the molten pool 14 is less than or equal to the threshold. When the molten pool width error is greater than the threshold, the processing condition adjustment unit 92 adjusts at least one of the laser power and the scanning speed such that the molten pool width error becomes equal to or less than the threshold that has been set. That is, the processing condition adjustment unit 92 performs feedback control on at least one of the laser power and the scanning speed on the basis of the molten pool width error. Note that when the processing condition adjustment unit 92 changes the scanning speed, the processing condition adjustment unit 92 adjusts the material feed speed in conformity to the scanning speed such that the height of the bead to be formed does not change. The processing condition adjustment unit 92 continues the adjustment of the applicable processing condition until the molten pool width error becomes equal to or less than the set threshold.

The threshold is a reference value for determining whether the measured molten pool width 81 matches the target molten pool width 102 with the margin of error. The value of the threshold can be set to any value by the user. That is, the threshold is a value enabling the measured molten pool width 81 to determine that the target molten pool width 102 and the measured molten pool width 81 matches with the margin of error.

The processing condition output unit 93 receives values of the laser power, the scanning speed, and the material feed speed output from the processing condition adjustment unit 92, the laser power addition unit 94, the speed addition unit 95, and the speed adjustment unit 96, as will be described later. The processing condition output unit 93 outputs the thus input values of the laser power, the scanning speed, and the material feed speed to the additive manufacturing system 100, i.e., the laser oscillator 3, the scan axis drive unit 6, and the material feed device 5. The laser oscillator 3, the scan axis drive unit 6, and the material feed device 5 operate according to command values from the processing condition output unit 93.

When the molten pool width error is greater than the threshold, the processing conditions are input from the processing condition adjustment unit 92 to the processing condition output unit 93. When the molten pool width error is less than or equal to the threshold, the processing conditions are input from the laser power addition unit 94, the speed addition unit 95, and the speed adjustment unit 96 to the processing condition output unit 93.

When the molten pool width error, which is a difference between the target molten pool width 102 and the measured molten pool width 81, is less than the predetermined threshold and the value of the laser power output from the processing condition output unit 93 is less than maximum power of the laser oscillator 3, the laser power addition unit 94 outputs a post-addition value of the laser power to the processing condition output unit 93, the post-addition value being the value of the laser power having a predetermined addition value added. Specifically, the laser power addition unit 94 receives the values of the laser power and the scanning speed output from the processing condition output unit 93. When the input value of the laser power has a certain margin relative to the maximum power of the laser oscillator 3 incorporated in the additive manufacturing system 100 and the input value of the scanning speed has not reached a maximum achievable scanning speed Fmax, the laser power addition unit 94 adds a predetermined addition value ΔP to the value of the laser power. The laser power addition unit 94 outputs, to the processing condition output unit 93, the value of the laser power with the addition value added. The addition value ΔP is a value that can be set to any value by the user. The laser power addition unit 94 corresponds to a heat source power addition unit.

When the value of the scanning speed output from the processing condition output unit 93 is less than a predetermined value, the speed addition unit 95 outputs a post-addition scanning speed to the processing condition output unit 93, the post-addition value being the scanning speed having an amount of change ΔF in the scanning speed (hereinafter, scanning speed change amount ΔF) added, the scanning speed change amount being dependent on the addition value ΔP of the laser power. Specifically, the speed addition unit 95 receives the values of the scanning speed and the material feed speed output from the processing condition output unit 93. When the laser power addition unit 94 has added the addition value ΔP to the value of the laser power, the speed addition unit 95 adds the scanning speed change amount ΔF to the value of a scanning speed F on the basis of the addition value ΔP of the laser power such that the molten pool width does not exceed the target molten pool width 102. The speed addition unit 95 also adds an amount of change ΔW in the material feed speed (hereinafter, material feed speed change amount ΔW) to a material feed speed W on the basis of the scanning speed change amount ΔF so as to keep constant the height of the bead to be formed. The speed addition unit 95 outputs the post-addition values of the scanning speed and the material feed speed to the processing condition output unit 93.

The laser power addition unit 94 and the speed addition unit 95 stepwise change the processing conditions, which may make the molten pool width error larger than the value obtained in feedback control performed by the processing condition adjustment unit 92. In view of this, the speed adjustment unit 96 adjusts the scanning speed and the material feed speed on the basis of the molten pool width error. Specifically, the speed adjustment unit 96 receives molten pool width error, and adjusts the scanning speed such that the molten pool width error becomes equal to or less than the set threshold. In addition, when the speed adjustment unit 96 adjusts the scanning speed, the speed adjustment unit 96 also adjusts the material feed speed at the same time on the basis of the amount of adjustment of the scanning speed (hereinafter, scanning speed adjustment amount) such that the height of the bead to be formed does not change. That is, the speed adjustment unit 96 performs feedback control on the scanning speed and the material feed speed on the basis of the molten pool width error. The speed adjustment unit 96 outputs the values of the adjusted scanning speed and the adjusted material feed speed to the processing condition output unit 93. Note that the configuration discussed herein has a function of preferentially maintaining the laser power having the addition value added by the laser power addition unit 94, and the laser power is therefore not adjusted.

The average processing condition calculation unit 97 receives the values of the laser power, the scanning speed, and the material feed speed output from the processing condition output unit 93, and calculates average values thereof for the same object layer. That is, the average processing condition calculation unit 97 calculates values of an average laser power, an average scanning speed, and an average material feed speed at the time of formation of a bead of a single object layer. The average laser power is an average heat source power.

Note that the processing condition adjustment unit 92 causes the additive manufacturing system 100 to operate using the initial processing condition 101, and performs feedback control on at least one of: the laser power; and the scanning speed and the material feed speed, the initial processing condition 101 being predetermined initial values of the laser power, the scanning speed, and the material feed speed at the start of building a first object layer formed of a bead. In addition, in changing an object layer to build, the processing condition adjustment unit 92 causes the additive manufacturing system 100 to operate using values of the average laser power, the average scanning speed, and the average material feed speed for an object layer built immediately before the change, the values of the average laser power, the average scanning speed, and the average material feed speed being used as values of the laser power, the scanning speed, and the material feed speed at the start of building an object layer after the change. The processing condition adjustment unit 92 then performs feedback control on at least one of: the laser power; and the scanning speed of the heat source and the material feed speed. In doing so, the processing condition adjustment unit 92 uses the values of the average laser power, the average scanning speed, and the average material feed speed calculated by the average processing condition calculation unit 97.

Figure 3:
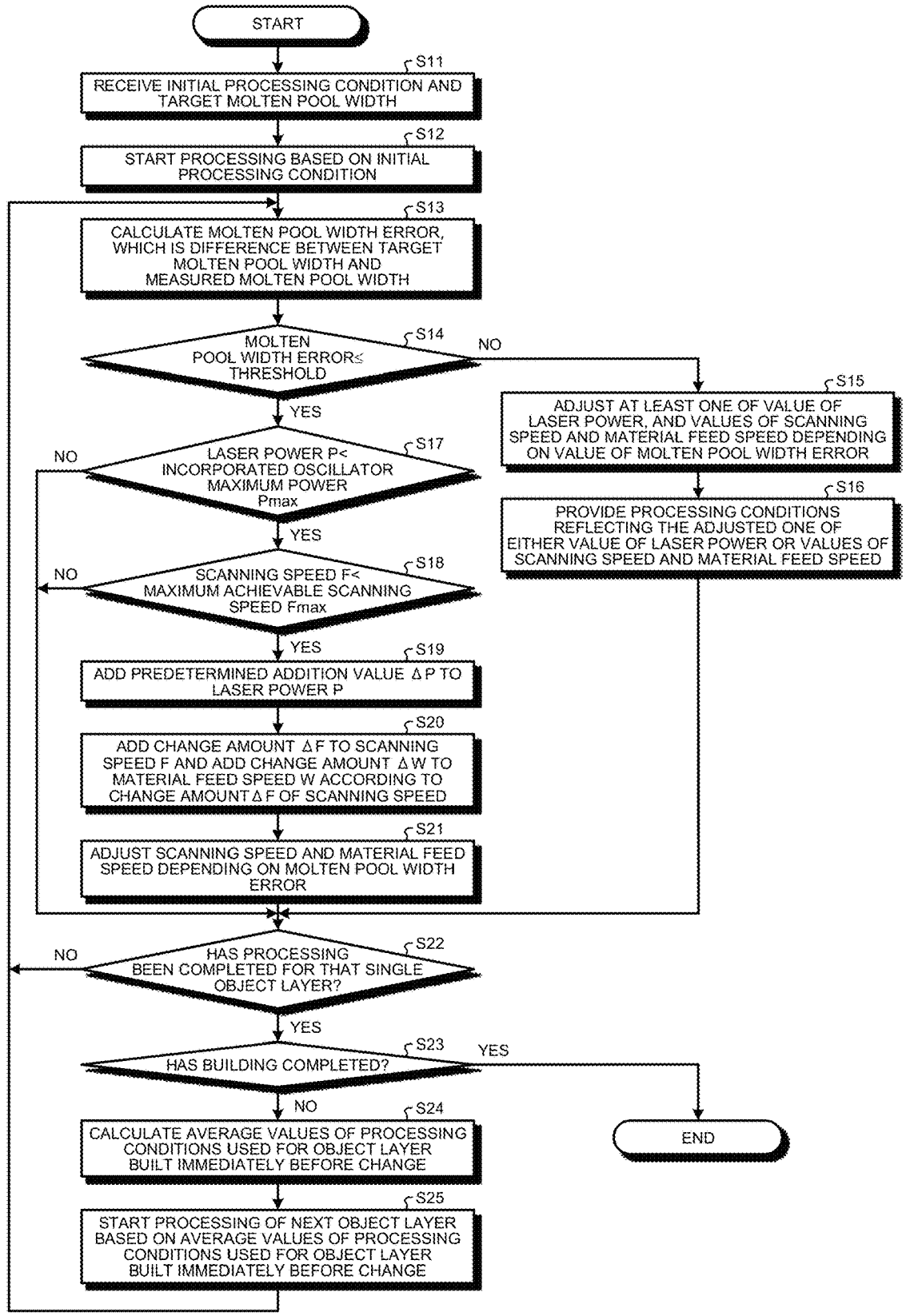
FIG. 3 is a flowchart illustrating an example of procedure of a control method of maximizing the speed of processing performed in the NC device of the additive manufacturing system according to the first embodiment.

Internal processing of the NC device 9 will next be described. FIG. 3 is a flowchart illustrating an example of procedure of a control method of maximizing the speed of processing performed in the NC device of the additive manufacturing system according to the first embodiment. First, the processing condition adjustment unit 92 receives the initial processing condition 101 and the target molten pool width 102 (step S11). The initial processing condition 101 includes values of the laser power, of the scanning speed, and the material feed speed. Next, processing starts on the basis of the initial processing condition 101 (step S12). The processing condition adjustment unit 92 outputs the initial processing condition 101 to the processing condition output unit 93. The processing condition output unit 93 outputs an initial value of the laser power to the laser oscillator 3, outputs an initial value of the scanning speed to the scan axis drive unit 6, and outputs an initial value of the material feed speed to the material feed device 5.

After the processing starts, the camera 7 captures an image at the processing position, i.e., an image showing the state of the molten pool 14, and outputs the image to the analysis device 8. The analysis device 8 detects the measured molten pool width 81 from the image, and inputs the measured molten pool width 81 to the molten pool width error calculation unit 91. Then, the molten pool width error calculation unit 91 calculates a molten pool width error, which is the difference between the target molten pool width 102 and the measured molten pool width 81 output from the analysis device 8 (step S13). The molten pool width error calculation unit 91 determines whether the molten pool width error is less than or equal to a predetermined threshold (step S14).

When the molten pool width error is not less than or equal to the threshold (the case of "No" at step S14), the processing condition adjustment unit 92 obtains the molten pool width error from the molten pool width error calculation unit 91, and adjusts at least one of: the value of the laser power; and the values of the scanning speed and the material feed speed according to the value of the molten pool width error (step S15). A conceivable adjustment method for use in this operation is, by way of example, feedback control such as proportional-integral-differential (PID) control. When the processing condition adjustment unit 92 adjusts the scanning speed, as described above, the processing condition adjustment unit 92 also adjusts the amount of feed of material according to the scanning speed change amount such that the height of the bead to be formed does not change.

In one example, when the molten pool width error is a positive value, meaning that the molten pool width in the shaping process is less than the target molten pool width 102, the processing condition adjustment unit 92 issues a command to increase the laser power or decrease the scanning speed. Alternatively, when the molten pool width error is a negative value, meaning that the molten pool width in the shaping process is greater than the target molten pool width 102, the processing condition adjustment unit 92 issues a command to decrease the laser power or increase the scanning speed.

After that, the processing condition adjustment unit 92 outputs, to the processing condition output unit 93, at least adjusted one of: the laser power; and the scanning speed and the material feed speed. The processing condition output unit 93 provides the processing condition reflecting the adjusted one of either the value of the laser power or the values of the scanning speed and the material feed speed (step S16). When adjusting the laser power, the processing condition output unit 93 outputs the value of the adjusted laser power to the laser oscillator 3. When adjusting the scanning speed, the processing condition output unit 93 outputs the value of the adjusted scanning speed to the scan axis drive unit 6 and outputs the value of the adjusted material feed speed to the material feed device 5. At least one of: the laser oscillator 3; and the scan axis drive unit 6 and the material feed device 5 operates with the command value input thereto to thereby change the molten pool width in the building process such that the changed molten pool width matches the target molten pool width 102.

Then, it is determined whether the processing has been completed for the single one object layer (step S22). In one example, that determination is made by the processing condition adjustment unit 92. When the processing has not yet been completed for that single object layer (the case of "No" at step S22), the process returns to step S13. The processing condition adjustment unit 92 then repeats the processing illustrated at steps S15 and S16 until the molten pool width error becomes equal to or less than the threshold. That is, only the operation of feedback control by the processing condition adjustment unit 92 is performed until the molten pool width in the building process matches the target molten pool width 102.

Alternatively, the case where the molten pool width error is less than or equal to the threshold at step S14 (the case of "Yes" at step S14) is the case where the molten pool width in the building process changes as a result of the process at steps S15 and S16 and matches the target molten pool width 102 with the margin of error. In this case, the laser power addition unit 94 obtains the values of the laser power and the scanning speed from the processing condition output unit 93, and determines whether the adjusted laser power is less than an incorporated oscillator maximum power Pmax, and the scanning speed is less than the maximum achievable scanning speed Fmax. In the example of FIG. 3, the laser power addition unit 94 determines, from the obtained value of the laser power, whether laser power P is less than the incorporated oscillator maximum power Pmax (step S17). After that, the laser power addition unit 94 determines whether the scanning speed F is less than the maximum achievable scanning speed Fmax, i.e., the maximum scanning speed achievable by the scan axis drive unit 6 (step S18). The determination at step S17 is performed from a viewpoint of hardware of the incorporated laser oscillator 3. The determination at step S18 is performed from a viewpoint of processing stability.

The incorporated oscillator maximum power Pmax means the maximum possible output value provided by the hardware specification of the laser oscillator 3 incorporated in the additive manufacturing system 100 and used in the processing. In addition, the maximum achievable scanning speed Fmax means the highest scanning speed that ensures control stability. In one example, the maximum achievable scanning speed Fmax is determined from an index representing the control stability obtained as a result of preliminary experimental processing performed using different scanning speeds.

When the adjusted laser power P is less than the incorporated oscillator maximum power Pmax (the case of "Yes" at step S17), and the scanning speed F is less than the maximum achievable scanning speed Fmax (the case of "Yes" at step S18), the laser power addition unit 94 determines that an increase in the laser power is feasible. That is, the laser power addition unit 94 adds the predetermined addition value $\Delta P$ to the laser power P (step S19), and outputs, to the processing condition output unit 93, the value of the laser power P with the addition value $\Delta P$ added. The processing condition output unit 93 then commands the laser oscillator 3 with the value of the laser power with the addition value added.

The addition of the addition value to the value of the laser power at step S19 will increase the molten pool width in excess of the target molten pool width 102. In view of this, when the addition value is added to the laser power at step S19, the speed addition unit 95 adds the scanning speed change amount $\Delta F$ to the scanning speed F. The addition of the scanning speed change amount $\Delta F$ to the scanning speed F decreases the amount of heat input per unit distance, thereby reducing the molten pool width. To keep the bead height constant, the speed addition unit 95 adds the material feed speed change amount $\Delta W$ to the material feed speed W according to the scanning speed change amount $\Delta F$ (step S20).

As the processing conditions, i.e., the laser power, the scanning speed, and the material feed speed, are changed stepwise at steps S19 and S20, the measured molten pool width 81 can fail to match the target molten pool width 102. To address this, thus, the speed adjustment unit 96 adjusts the scanning speed and the material feed speed in accordance with the molten pool width error obtained from the molten pool width error calculation unit 91 (step S21). That is, the speed adjustment unit 96 performs feedback control on the scanning speed and the material feed speed in accordance with the molten pool width error. In one example, the speed adjustment unit 96 adjusts the scanning speed F, using a scanning speed adjustment amount $\Delta Ffb$, for performing feedback control on the scanning speed in accordance with the molten pool width error. The speed adjustment unit 96 also adjusts the material feed speed W, using a material feed speed adjustment amount $\Delta Wfb$, for performing feedback control on the material feed speed in accordance with the molten pool width error. This reduces the molten pool width error that has occurred. Note that to maintain the command value with the addition value added at step S19, the value of the laser power is not adjusted in the process at step S21. Then, the processing condition adjustment unit 92 determines whether the processing has been completed for that single object layer (step S22). When the processing has not yet been completed for that single object layer (the case of "No" at step S22), the process returns to step S13 to continue the processing for the same object layer. That is, when the molten pool width error is less than or equal to the threshold, the processing is performed using the values of the laser power, the scanning speed, and the material feed speed, which are obtained by the adjustment and addition in the process from step S17 to step S21, after which the process returns to step S13 for adjusting the processing conditions again.

When the laser power P is greater than or equal to the incorporated oscillator maximum power Pmax at step S17 (the case of "No" at step S17), or when the scanning speed F is greater than or equal to the maximum achievable scanning speed Fmax at step S18 (the case of "No" at step S18), the laser power addition unit 94 determines that the increase in the laser power is not feasible, and the process proceeds to step S22.

When the processing condition adjustment unit 92 determines that the processing has been completed for that single object layer at step S22 (the case of "Yes" at step S22), the processing condition adjustment unit 92 determines whether the building has been completed (step S23). When the processing condition adjustment unit 92 determines that the building of an object has not yet completed (the case of "No" at step S23), it is time to change the object layer to build. When the object layer to build is changed, the building position and the heat accumulation state changes. It is therefore undesirable that the processing conditions obtained by the adjustment and/or the addition in the process from step S15 to step S21 for building the object layer immediately before the change continue to be used for the processing of the object layer after the change. Moreover, use of the initial processing condition 101 might result in instability in the building operation immediately after the start of processing due to a different heat accumulation state.

Thus, in the first embodiment, the average processing condition calculation unit 97 calculates average values of the processing conditions that have been used for the object layer built immediately before the change. That is, the average processing condition calculation unit 97 calculates the average laser power, the average scanning speed, and the average material feed speed, which are average values of the laser power, the scanning speed, and the material feed speed for the object layer built immediately before the change (step S24). Processing of a next object layer then starts on the basis of the values of the average laser power, the average scanning speed, and the average material feed speed, which are average values of the processing conditions that have been used for the object layer built immediately before the change (step S25). Because the average laser power, the average scanning speed, and the average material feed speed are processing conditions reflecting the heat accumulation state in the object layer that was built immediately before the change, the stability immediately after the start of processing is improved as compared to when the initial processing condition 101 is used. The process then proceeds to step S13. Alternatively, when the processing condition adjustment unit 92 determines that the building of the object has been completed (the case of "Yes" at step S23), the processing condition output unit 93 terminates the process.

Figure 4:
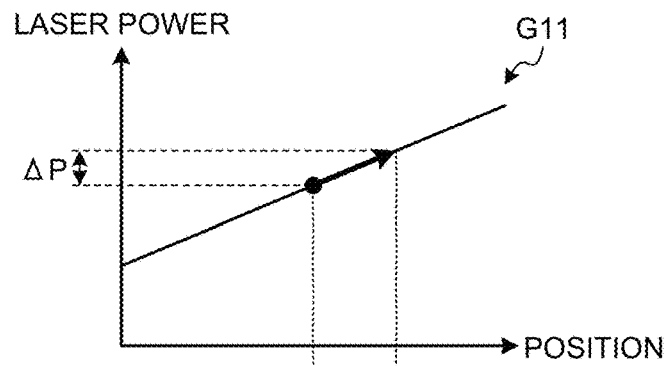
FIG. 4 is a diagram illustrating an example of relationship between the laser power and the molten pool width in a control method for the additive manufacturing system according to the first embodiment.
Figure 4:
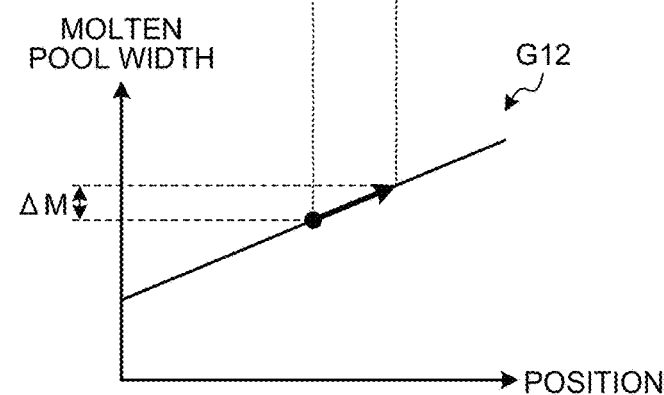
Figure 5:
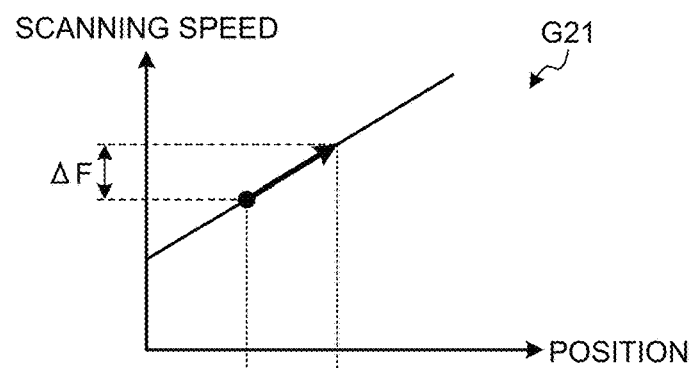
FIG. 5 is a diagram illustrating an example of relationship between the scanning speed and the molten pool width in the control method for the additive manufacturing system according to the first embodiment.
Figure 5:
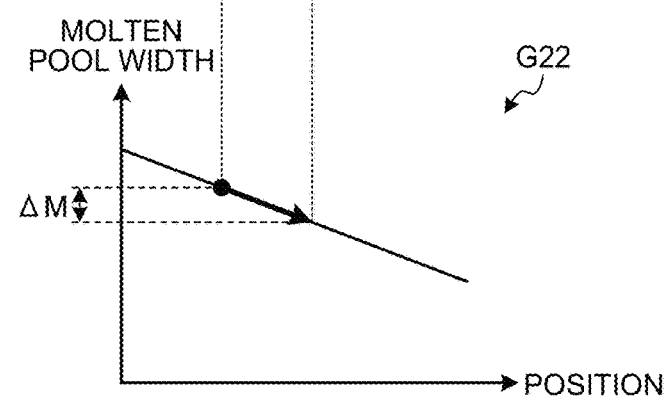

A method in which the speed addition unit 95 calculates the material feed speed change amount $\Delta W$ according to the scanning speed change amount $\Delta F$ will next be described. FIG. 4 is a diagram illustrating an example of relationship between the laser power and the molten pool width in the control method for the additive manufacturing system according to the first embodiment. FIG. 5 is a diagram illustrating an example of relationship between the scanning speed and the molten pool width in the control method for the additive manufacturing system according to the first embodiment. In graph G11 in the upper portion of FIG. 4, the horizontal axis represents the position, and the vertical axis represents the laser power. In graph G12 in the lower portion of FIG. 4, the horizontal axis represents the position, and the vertical axis represents the molten pool width. FIG. 4 illustrates graph G11 in the upper portion and graph G12 in the lower portion with the positions in alignment with each other. In graph G21 in the upper portion of FIG. 5, the horizontal axis represents the position, and the vertical axis represents the scanning speed. In graph G22 in the lower portion, the horizontal axis represents the position, and the vertical axis represents the molten pool width. FIG. 5 illustrate graph G21 in the upper portion and graph G22 in the lower portion with the positions in alignment with each other. The position represented along the horizontal axis in each of these graphs is, in one example, a position on a movement path.

In FIG. 4, $\Delta M$ denotes the amount of change in the molten pool width (hereinafter, molten pool width change amount) when the laser power is increased by the predetermined addition value $\Delta P$. The molten pool width change amount $\Delta M$ can be expressed as Equation (1) below by assuming that the molten pool width change amount $\Delta M$ is a function with a variable that is the addition value $\Delta P$ of the laser power. This relationship between the molten pool width change amount $\Delta M$ and the addition value $\Delta P$ of the laser power needs to be determined in advance.

$$\Delta M = f(\Delta P) \tag{1}$$

In addition, in FIG. 5, $\Delta F$ denotes the scanning speed change amount for reducing the molten pool width by $\Delta M$. The scanning speed change amount $\Delta F$ can be expressed as Equation (2) below assuming that the scanning speed change amount $\Delta F$ is a function with a variable that is the molten pool width change amount $\Delta M$. This relationship between the scanning speed change amount $\Delta F$ and the molten pool width change amount $\Delta M$ needs to be determined in advance.

$$\Delta F = g(\Delta M) \tag{2}$$

The scanning speed change amount $\Delta F$ by which the scanning speed needs to be changed in order to maintain the molten pool width when the laser power is changed by the addition value $\Delta P$ can be derived from Equations (1) and (2) as expressed by Equation (3) below.

$$\Delta F = g(f(\Delta P)) \tag{3}$$

This means that Equation (3) can provide the scanning speed change amount $\Delta F$ when the laser power is changed by the addition value $\Delta P$.

Time is taken to capture and analyze the image before the calculation of the measured molten pool width 81. The molten pool width is delayed in changing in response the scanning speed. These factors are not ignorable when the scanning speed exceeds a predetermined value, which results in the failure to correctly adjust the scanning speed. This limit of the scanning speed for allowing the correct adjustment is referred to as the maximum achievable scanning speed Fmax. This maximum achievable scanning speed Fmax is set by the user taking into account the sampling period of the camera 7, the analysis time in the analysis device 8, the command value output period of the NC device 9, and the response delay of the molten pool width with respect to the scanning speed.

When the scanning speed is greater than the maximum achievable scanning speed Fmax, the laser power addition unit 94 performs no addition operation of the laser power, and the speed addition unit 95 performs no addition operations of the scanning speed and the material feed speed. That is, the speed adjustment unit 96 does not adjust the scanning speed and the material feed speed.

Figure 6:
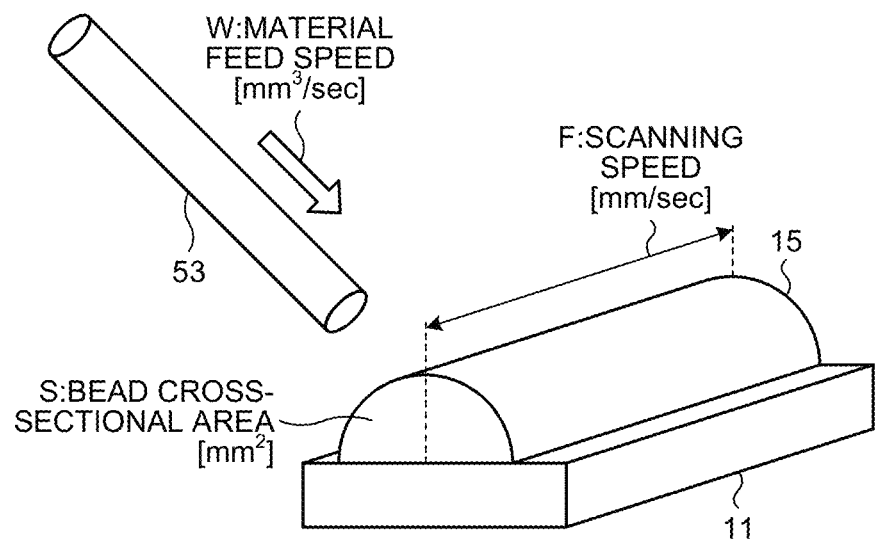
FIG. 6 is a perspective view illustrating an example of method for deriving a material feed speed required for shaping in the control device for the additive manufacturing system according to the first embodiment.
Figure 7:
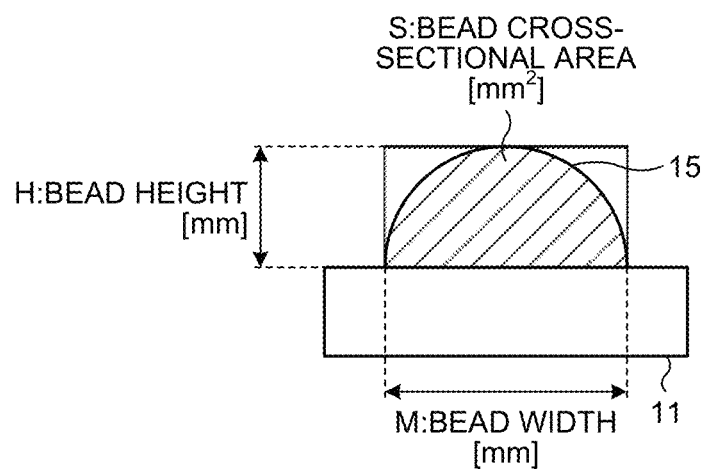
FIG. 7 is a cross-sectional view illustrating an example of the method for deriving a material feed speed required for shaping in the control device for the additive manufacturing system according to the first embodiment.

FIG. 6 is a perspective view illustrating an example of method for deriving a material feed speed required for shaping in the control device for the additive manufacturing system according to the first embodiment. FIG. 7 is a cross-sectional view illustrating an example of the method for deriving a material feed speed required for shaping in the control device for the additive manufacturing system according to the first embodiment. As illustrated in FIGS. 6 and 7, when the feedstock 53 is in a wire form, the entire feedstock 53 is melted and forms a bead 15 without excess or deficiency, such that the volume of the bead 15 formed per unit time is equal to the volume of the feedstock 53 fed per unit time. In this respect, the material feed speed W, the scanning speed F, and a bead cross-sectional area S have a relationship expressed by Equation (4) below.

$$W = F \times S \quad (4)$$

As illustrated in FIG. 7, a bead width M, which is the width of the bead 15 on a cross section of the bead 15, and a bead height H, which is the height of the bead 15 on the cross section of the bead 15, form a quadrangle, and the proportion of a bead cross-sectional area S to the area of that quadrangle is denoted by a bead cross-section factor K. This bead cross-section factor K is introduced for taking into account the geometrical shape of the bead 15, and the value thereof can be set to any value by the user. The bead cross-sectional area S is expressed by Equation (5) below, using the bead width M, the bead height H, and the bead cross-section factor K.

$$S = M \times H \times K \quad (5)$$

Accordingly, Equation (4) can be rewritten as Equation (6) below, using the bead width M, the bead height H, and the bead cross-section factor K.

$$W = F \times (M \times H \times K) \quad (6)$$

From the foregoing, the amount of change $\Delta W$ in the material feed speed W to be used when the scanning speed F is changed by $\Delta F$ can be calculated as Equation (7) below. Note that the bead height H is a target building height $H_{target}$, which can be set to any value by the user. In addition, assuming that the molten pool width is equal to the bead width, a measured molten pool width $M_{measure}$ obtained in real time during the building process can be used as the bead width M. That is, the speed addition unit 95 can calculate the material feed speed change amount $\Delta W$, using the measured molten pool width $M_{measure}$, the target building height $H_{target}$, the scanning speed change amount $\Delta F$, and the geometrical shape of the bead 15.

$$\Delta W = \Delta F \times (M_{measure} \times H_{target} \times K) \quad (7)$$

Figure 8:
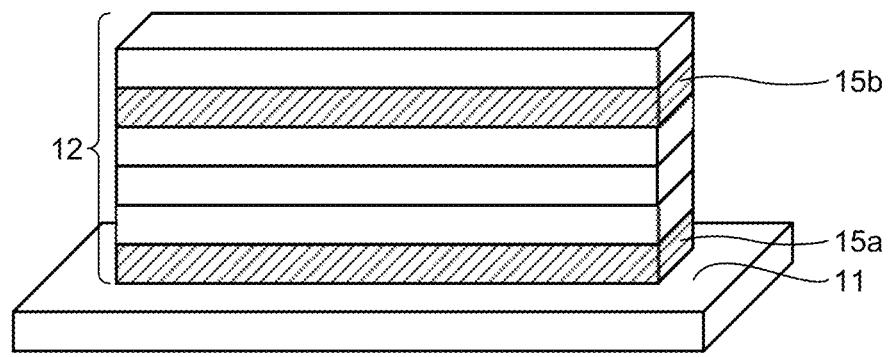
FIG. 8 is a perspective view schematically illustrating an example of configuration of a shaped article formed by the additive manufacturing system.

FIG. 8 is a perspective view schematically illustrating an example of configuration of a shaped article formed by the additive manufacturing system. FIG. 8 illustrates a situation in which the object 12 made up of six layers of beads 15 is formed on the substrate 11.

Figure 9:
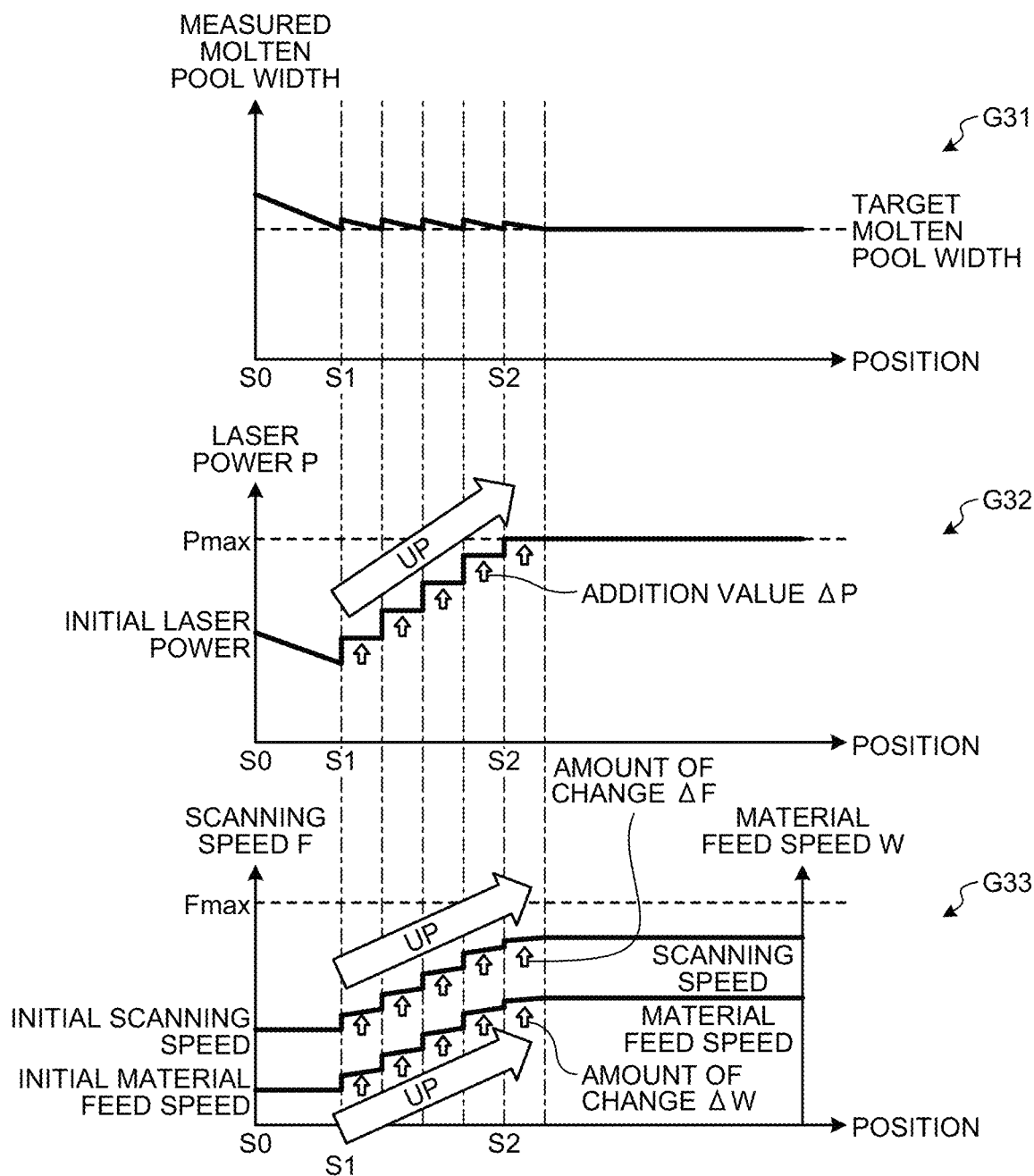
FIG. 9 is a diagram illustrating an example of effect in increasing the shaping speed in a first layer provided in the control method for the additive manufacturing system according to the first embodiment.

FIG. 9 is a diagram illustrating an example of effect of improving the shaping speed in a first layer provided in the control method for the additive manufacturing system according to the first embodiment. In graph G31 in the upper portion of FIG. 9, the horizontal axis represents the position, and the vertical axis represents the measured molten pool width. In graph G32 in the middle portion of FIG. 9, the horizontal axis represents the position, and the vertical axis represents the laser power. In graph G33 in the lower portion of FIG. 9, the horizontal axis represents the position, the left vertical axis represents the scanning speed, and the right vertical axis represents the material feed speed. FIG. 9 illustrates graph G31 in the upper portion, graph G32 in the middle portion, and graph G33 in the lower portion with the positions in alignment with one another. Note that the position represented along the horizontal axis in each of these graphs is, in one example, a position on a movement path.

The first layer, i.e., a first-layer bead 15a on the substrate 11 of FIG. 8, is processed in such a manner that, as illustrated in FIG. 9, processing starts using the values of initial laser power, an initial material feed speed, and an initial scanning speed, which have been determined as the initial processing condition 101, and the processing condition adjustment unit 92 adjusts the laser power such that the measured molten pool width 81 matches the target molten pool width 102. That is, when the position is from S0 to S1, the scanning speed and the material feed speed remain constant but the laser power alone is lowered, thereby allowing the measured molten pool width 81 to match the target molten pool width 102.

With the measured molten pool width 81 matching the target molten pool width 102 at position S1, the laser power P at position S1 is less than the incorporated oscillator maximum power Pmax in graph G32, and the scanning speed F at position S1 is less than the maximum achievable scanning speed Fmax in graph G33. Thus, the laser power addition unit 94 adds the addition value $\Delta P$ to the laser power P. At the same time, the amounts of change $\Delta F$ and $\Delta W$ are added to the scanning speed F and the material feed speed W, respectively. After the addition of those amounts of change, the measured molten pool width 81 deviates from the target molten pool width 102, thereby causing a molten pool width error. In view of this, the scanning speed F and the material feed speed W are adjusted to control the molten pool width error such that the controlled error reaches or falls below the threshold. As a result, the scanning speed F and the material feed speed W are not constant but slowly increase in graph G33 while the laser power P has a constant value in graph G32 between the addition of the addition value $\Delta P$ to the laser power P and the next addition of the addition value $\Delta P$ to the laser power P after the measured molten pool width 81 matches the target molten pool width 102.

After that, the addition of the addition value $\Delta P$ to the laser power P is performed multiple times to thereby increase the laser power P to the incorporated oscillator maximum power Pmax. In concurrence with the addition of the addition value $\Delta P$ to the laser power P, the amount of change $\Delta F$ is added to the scanning speed F, and the amount of change $\Delta W$ is added to the material feed speed W. Then, after the laser power P reaches the incorporated oscillator maximum power Pmax at position S2, the processing condition adjustment unit 92 continues the adjustment operation by performing feedback control on the processing conditions.

As described above, increasing the laser power P to the incorporated oscillator maximum power enables the material feed speed W to increase, which results in improvement of the building speed.

Figure 10:
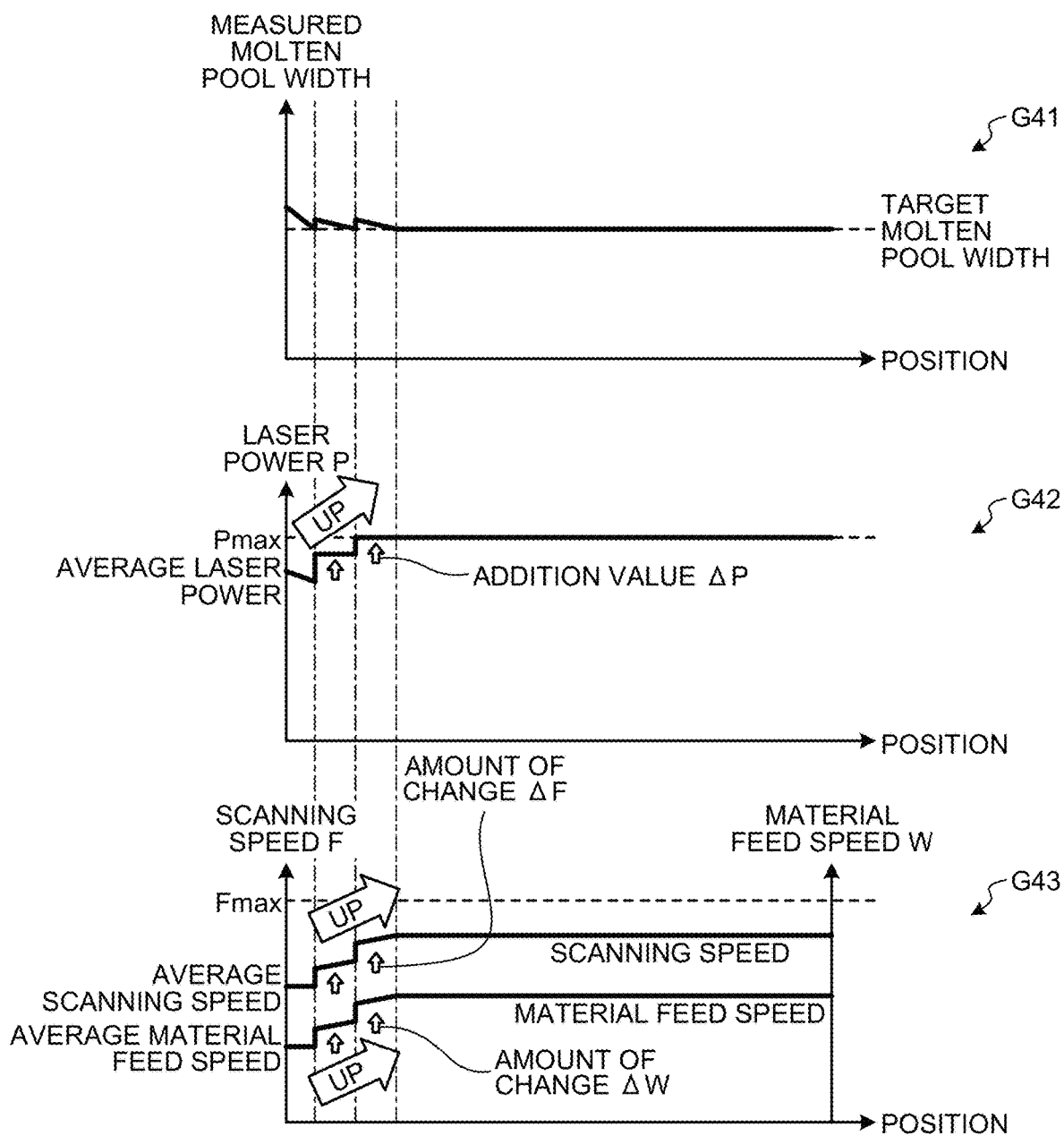
FIG. 10 is a diagram illustrating an example of effect in increasing the shaping speed in second and upper layers provided in the control method for the additive manufacturing system according to the first embodiment.

FIG. 10 is a diagram illustrating an example of effect in increasing the shaping speed in second and upper layers provided in the control method for the additive manufacturing system according to the first embodiment. In graph G41 in the upper portion of FIG. 10, the horizontal axis represents the position, and the vertical axis represents the measured molten pool width. In graph G42 in the middle portion of FIG. 10, the horizontal axis represents the position, and the vertical axis represents the laser power. In graph G43 in the lower portion of FIG. 10, the horizontal axis represents the position, the left vertical axis represents the scanning speed, and the right vertical axis represents the material feed speed. FIG. 10 illustrates graph G41 in the upper portion, graph G42 in the middle portion, and graph G43 in the lower portion with the positions in alignment with one another. Note that the position represented along the horizontal axis in each of these graphs is, in one example, a position on a movement path.

The values of the average laser power, the average scanning speed, and the average material feed speed for the object layer built immediately before are used as the values of the laser power, the scanning speed, and the material feed speed at the start of building the second and subsequent upper layers, an example of which is a fifth-layer bead 15b of FIG. 8. As the building starts with processing conditions reflecting the heat accumulation state, the accuracy of the building is improved. This is because the time taken until the measured molten pool width 81 matches the target molten pool width 102 is reduced as compared to the use of the initial processing condition 101 in FIG. 9.

Figure 11:
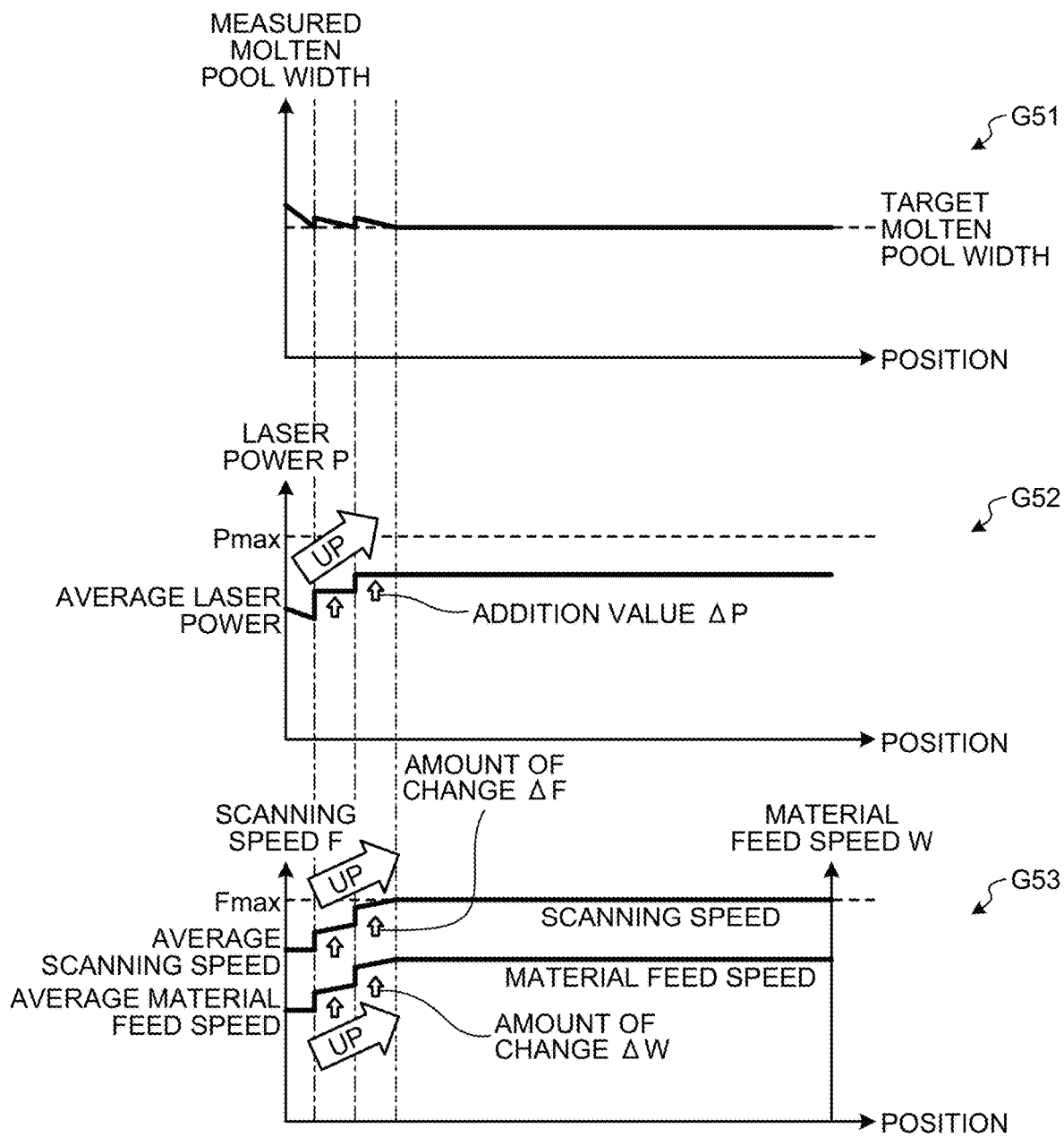
FIG. 11 is a diagram illustrating an example of behavior when the scanning speed reaches a maximum achievable scanning speed in the control method for the additive manufacturing system according to the first embodiment.

FIG. 11 is a diagram illustrating an example of behavior when the scanning speed reaches the maximum achievable scanning speed in the control method for the additive manufacturing system according to the first embodiment. In graph G51 in the upper portion of FIG. 11, the horizontal axis represents the position, and the vertical axis represents the measured molten pool width. In graph G52 in the middle portion of FIG. 11, the horizontal axis represents the position, and the vertical axis represents the laser power. In graph G53 in the lower portion of FIG. 11, the horizontal axis represents the position, the left vertical axis represents the scanning speed, and the right vertical axis represents the material feed speed. FIG. 11 illustrates graph G51 in the upper portion, graph G52 in the middle portion, and graph G53 in the lower portion with the positions in alignment with one another. Note that the position represented along the horizontal axis in each of these graphs is, in one example, a position on a movement path.

As illustrated in FIG. 11, when the scanning speed F reaches the maximum achievable scanning speed Fmax before the laser power P reaches the incorporated oscillator maximum power Pmax, no addition operation is performed on the laser power P, thereby preventing the laser power P from reaching the incorporated oscillator maximum power Pmax. That is, in some case, depending on the setting value of the maximum achievable scanning speed Fmax or the heat accumulation state, the laser power P does not reach the incorporated oscillator maximum power Pmax. In view of this, use of the incorporated oscillator maximum power Pmax from the beginning of processing is inappropriate, but the laser power P needs to be increased stepwise.

According to the first embodiment, feedback control is performed on at least one of: the laser power; and the scanning speed and the material feed speed until the molten pool width error becomes zero, that is, until the measured molten pool width 81 matches the target molten pool width 102. In addition, when the scanning speed does not reach the maximum achievable scanning speed Fmax after the measured molten pool width 81 matched the target molten pool width 102, the laser power for use in processing is increased to the incorporated oscillator maximum power Pmax, and at the same time, the scanning speed and the material feed speed are increased. In this case, the scanning speed and the material feed speed are adjusted through feedback control in accordance with the molten pool width error. This not only makes it less likely that the laser output device, which is the heat source, fails to make full use of its capability, but also obtains the highest possible building speed with the incorporated oscillator output power, maintaining a desired bead height. That is, as it becomes possible to reduce or prevent the bead height decrease that would occur with an increase in the scanning speed, building speed can be improved without deteriorating building accuracy. The conventional technology reduces the amount of heat input per unit area particularly for an upper layer portion of stacked beads having high heat accumulation by lowering the laser power or increasing the scanning speed. In contrast, in the first embodiment, the scanning speed and the material feed speed are increased without lowering the laser power. This makes it possible to improve building accuracy and building speed as compared to the conventional technology even in an upper layer portion of the object 12 having higher heat accumulation than in a non-heat accumulated portion.

In addition, in building the next object layer, the average laser power, the average scanning speed, and the average material feed speed for the object layer built immediately before are used as the processing conditions for staring to build the next object layer. This can improve the building accuracy because the processing stability for each object layer is improved as compared to the start of processing of each object layer, using the preset initial processing condition 101.

Second Embodiment

The material feed device 5 illustrated in FIG. 1 feeds the feedstock 53 from the material feed nozzle 52. The first embodiment has been described with respect to an example of the feedstock 53 in a wire form. A second embodiment will be described with respect to an example of the feedstock 53 in powder form.

The additive manufacturing system 100 of the second embodiment is basically configured similarly to the first embodiment. Differences from the first embodiment will be described below. As described above, the material feed device 5 in the second embodiment feeds the feedstock 53 in a powder form from the material feed nozzle 52. Although the form of the feedstock 53 changes from a wire to powder, similar advantages can be provided by the modified method for deriving the material feed speed required for building in the speed addition unit 95.

Figure 12:
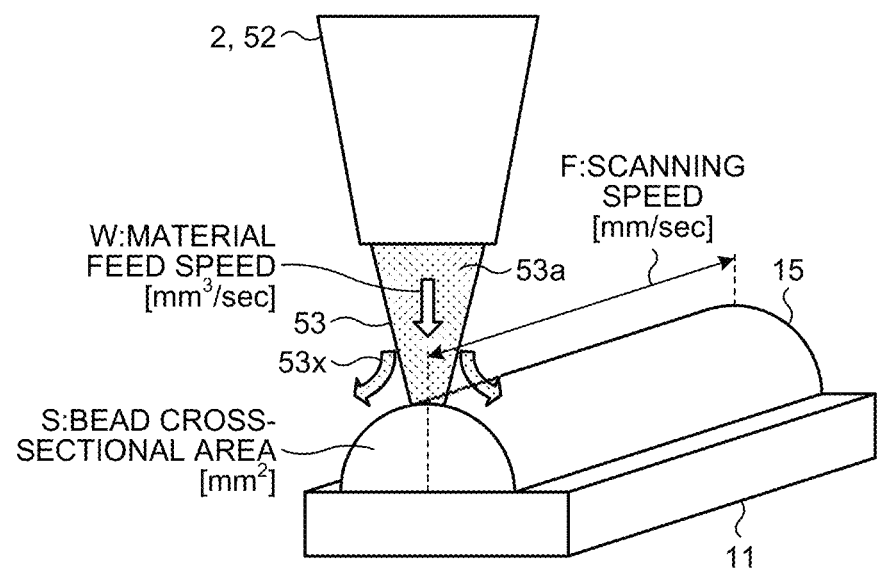
FIG. 12 is a perspective view illustrating an example of method for deriving a material feed speed required for shaping in the control device for the additive manufacturing system according to a second embodiment.
Figure 13:
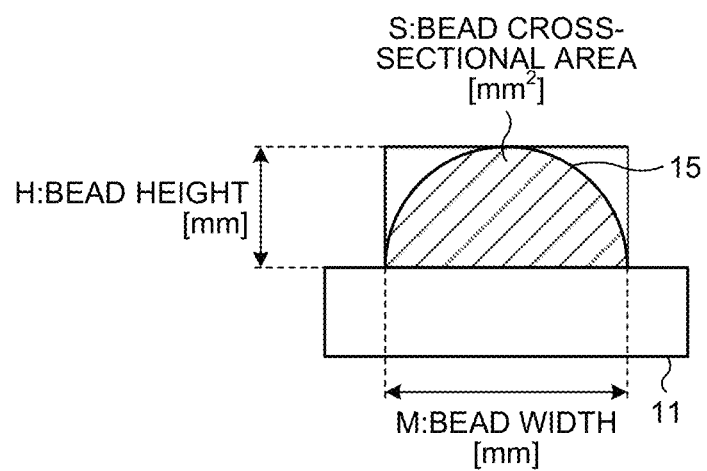
FIG. 13 is a cross-sectional view illustrating an example of the method for deriving a material feed speed required for shaping in the control device for the additive manufacturing system according to the second embodiment.

FIG. 12 is a perspective view illustrating an example of method for deriving a material feed speed required for shaping in the control device for the additive manufacturing system according to the second embodiment. FIG. 13 is a cross-sectional view illustrating an example of the method for deriving a material feed speed required for building in the control device for the additive manufacturing system according to the second embodiment. Note that FIG. 12 illustrates an example in which the material feed nozzle 52 of the material feed device 5 is disposed in the processing head 2.

Not all the feedstock 53 contributes to the building because some of the feedstock 53 in a powder form splashes to other than the molten pool 14 during feeding. Feedstock 53a that practically contributes to building can be expressed by Equation (8) below, where reference character $W_{melt}$ represents the feed speed of the feedstock 53a contributing to the building, and reference character A represents a building-contribution rate, assuming that the feed speed $W_{melt}$ of the feedstock 53a contributing to the building is proportional to the material feed speed W and the building-contribution rate A is a proportion of the feed speed $W_{melt}$ of the feedstock 53a to the material feed speed W. The building-contribution rate A is a value that can be set to any value by the user taking the device configuration, etc. into consideration.

$$W_{melt} = W \times A \qquad (8)$$

That is, replacement of the material feed speed W in the first embodiment with the feed speed $W_{melt}$ of the feedstock 53a contributing to the building allows calculation of the amount of change ΔW in the material feed speed W in the second embodiment, as shown Equation (9) below.

$$\Delta W = \Delta F \times (M_{measure} \times H_{target} \times K)/A \qquad (9)$$

Similar advantages to the advantages of the first embodiment can be provided also in the second embodiment by calculating the amount of change ΔW in the material feed speed W, using Equation (9), taking into account feedstock 53x not contributing to building.

Note that in the foregoing description, the laser power addition unit 94 performs addition operation on the laser power, after which the speed addition unit 95 then performs addition operation on the scanning speed and the material feed speed. However, these addition operations may be performed in reverse order. That is, the operation at step S19 and the operation at step S20 in FIG. 3 may be interchanged.

In addition, the speed adjustment unit 96 and the processing condition adjustment unit 92 of the first and second embodiments adjust the applicable processing conditions, receiving the molten pool width error as an input thereto. However, the adjustment of the processing conditions may be performed with an input of a difference from a target value of the area or a shape of the molten pool 14 rather than the difference from the target value of the molten pool width. That is, the state of the molten pool may be the area or shape of the molten pool 14, and the processing conditions may be adjusted with an input of a difference between molten pool state target information, which is a target value of the state of the molten pool 14, and molten pool state measurement information, which is a measurement value of the state of the molten pool 14.

Figure 14:
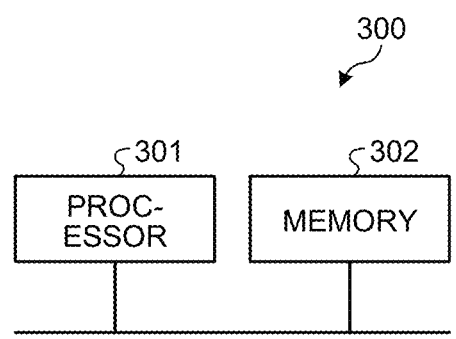
FIG. 14 is a diagram illustrating an example of hardware configuration of the NC device of the additive manufacturing system according to the first and second embodiments.

A hardware configuration of the NC device 9 of the additive manufacturing system 100 will now be described. FIG. 14 is a diagram illustrating an example of hardware configuration of the NC device of the additive manufacturing system according to the first and second embodiments.

The NC device 9 can be implemented in a control circuit 300, i.e., a processor 301 and a memory 302, illustrated in FIG. 14. Examples of the processor 301 include a central processing unit (CPU) (also known as processing unit, computing unit, microprocessor, microcomputer, processor, and digital signal processor (DSP)) and a system large scale integration (LSI). Examples of the memory 302 include a random access memory (RAM) and a read only memory (ROM).

When functionality of part or all of the molten pool width error calculation unit 91, the processing condition adjustment unit 92, the processing condition output unit 93, the laser power addition unit 94, the speed addition unit 95, the speed adjustment unit 96, and the average processing condition calculation unit 97 of FIG. 2 is implemented in the processor 301, the functionality of that part or all thereof is implemented in the processor 301 and software, firmware, or a combination of software and firmware. The software or firmware is described in the form of a program, and is stored in the memory 302. The processor 301 reads and executes a program stored in the memory 302 to thereby implement the functionality of the part or all of the molten pool width error calculation unit 91, the processing condition adjustment unit 92, the processing condition output unit 93, the laser power addition unit 94, the speed addition unit 95, the speed adjustment unit 96, and the average processing condition calculation unit 97.

When the functionality of part or all of the molten pool width error calculation unit 91, the processing condition adjustment unit 92, the processing condition output unit 93, the laser power addition unit 94, the speed addition unit 95, the speed adjustment unit 96, and the average processing condition calculation unit 97 is implemented in the processor 301, the NC device 9 is configured such that the memory 302 stores the program that causes steps to be performed, which steps are to be performed by the part or all of the molten pool width error calculation unit 91, the processing condition adjustment unit 92, the processing condition output unit 93, the laser power addition unit 94, the speed addition unit 95, the speed adjustment unit 96, and the average processing condition calculation unit 97. It can also be said that the program stored in the memory 302 causes a computer to perform a procedure or method to be performed by the part or all of the molten pool width error calculation unit 91, the processing condition adjustment unit 92, the processing condition output unit 93, the laser power addition unit 94, the speed addition unit 95, the speed adjustment unit 96, and the average processing condition calculation unit 97.

A control program to be executed by the processor 301 describing a control method for the additive manufacturing system 100 may be stored in a computer-readable storage medium in a form of an installable or executable file, and provided as a computer program product. Moreover, the control program to be executed by the processor 301 may be provided to the NC device 9 of the additive manufacturing system 100 via a network such as the Internet.

In addition, the NC device 9 may be implemented in a dedicated hardware element. Moreover, the functionality of the NC device 9 may be implemented partially in a dedicated hardware element and partially in software or firmware.

The configurations described in the foregoing embodiments are merely examples. These configurations may be combined with another known technology, and configurations of different embodiments may be combined together. Moreover, part of such configurations may be omitted and/or modified without departing from the spirit thereof.

REFERENCE SIGNS LIST 1 stage; 2 processing head; 3 laser oscillator; 4 gas supply device; 5 material feed device; 6 scan axis drive unit; 7 camera; 8 analysis device; 9 NC device; 11 substrate; 12 shaped article; 13 workpiece; 14 molten pool; 15, 15a, 15b bead; 21 beam nozzle; 22 gas nozzle; 31 fiber cable; 51 material feed source; 52 material feed nozzle; 53 feedstock; 53a feedstock contributory to shaping; 53x feedstock not contributory to shaping; 91 molten pool width error calculation unit; 92 processing condition adjustment unit; 93 processing condition output unit; 94 laser power addition unit; 95 speed addition unit; 96 speed adjustment unit; 97 average processing condition calculation unit; 100 additive manufacturing system; G shield gas; L laser beam.

The invention claimed is:

1. A control device for an additive manufacturing system to emit a heat source onto feedstock fed onto a workpiece to melt and solidify the feedstock into beads, and build an object by stacking the beads on the workpiece, the control device controlling, on a basis of molten pool state measurement information, at least one of: power of the heat source; or a scanning speed of the heat source and a material feed speed of the feedstock, the molten pool state measurement information being a value obtained by measurement of a state of a molten pool, the molten pool being the melted feedstock, the control device comprising:
processing condition output circuitry to output values of the power of the heat source, the scanning speed of the heat source, and the material feed speed to the additive manufacturing system;
heat source power addition circuitry to output a post-addition value of the power of the heat source to the processing condition output circuitry when a molten pool state error is less than a predetermined threshold and the value of the power of the heat source output from the processing condition output circuitry is less than maximum power of the heat source, the post-addition value being a value of the power of the heat source having a predetermined addition value added, the molten pool state error being a difference between molten pool state target information and the molten pool state measurement information, the molten pool state target information being a targeted value of the state of the molten pool;
molten pool state error calculation circuitry to calculate the molten pool state error from a captured image of the state of the molten pool; and
speed adjustment circuitry to adjust the scanning speed of the heat source and the material feed speed on the basis of the molten pool state error.

2. The control device for the additive manufacturing system according to claim 1, further comprising speed addition circuitry to output a post-addition scanning speed to the processing condition output circuitry when the value of the scanning speed output from the processing condition output circuitry is less than a predetermined value, the post-addition scanning speed being the scanning speed having a scanning speed change amount added, the scanning speed change amount being an amount of change in the scanning speed and being dependent on the addition value added to the power of the heat source.

3. The control device for the additive manufacturing system according to claim 2, wherein at a time of the addition of the scanning speed change amount to the scanning speed, the speed addition circuitry outputs a post-addition material feed speed to the processing condition output circuitry, the post-addition material feed speed being the material feed speed having a material feed speed change amount added, the material feed speed change amount being an amount of change in the material feed speed and being dependent on the scanning speed change amount.

4. The control device for the additive manufacturing system according to claim 2, wherein the speed addition circuitry calculates the scanning speed change amount, using a relationship determined in advance between the power of the heat source and the state of the molten pool and a relationship determined in advance between the scanning speed and the state of the molten pool.

5. The control device for the additive manufacturing system according to claim 3, wherein the speed addition circuitry calculates the material feed speed change amount, using the molten pool state measurement information, the scanning speed, and a geometrical shape of a corresponding one of the beads.

6. The control device for the additive manufacturing system according to claim 1, further comprising: processing condition adjustment circuitry to cause the additive manufacturing system to operate using initial values predetermined as values of the power of the heat source, the scanning speed of the heat source, and the material feed speed at a start of building a first object layer formed of one of the beads, and to adjust at least one of: the power of the heat source; or the scanning speed of the heat source and the material feed speed, wherein
when an object layer to build is changed, the processing condition adjustment circuitry causes the additive manufacturing system to operate using values of an average heat source power, an average scanning speed, and an average material feed speed for an object layer built immediately before change, as values of the power of the heat source, the scanning speed of the heat source, and the material feed speed at a start of building an object layer after the change, and adjusts at least one of: the power of the heat source; or the scanning speed of the heat source and the material feed speed.

7. The control device for the additive manufacturing system according to claim 6, further comprising average processing condition calculation circuitry to calculate the values of the average heat source power, the average scanning speed, and the average material feed speed at a time of formation of a corresponding one of the beads of a single object layer.

8. A control method for controlling an additive manufacturing system to emit a heat source onto feedstock fed onto a workpiece to melt and solidify the feedstock into form beads, and build an object by stacking the beads on the workpiece, the control method controlling, on a basis of molten pool state measurement information, at least one of: power of a heat source; or a scanning speed of the heat source and a material feed speed of the feedstock, the molten pool state measurement information being a value obtained by measurement of a state of a molten pool, the molten pool being the melted feedstock, the control method comprising:
outputting values of the power of the heat source, the scanning speed of the heat source, and the material feed speed to the additive manufacturing system;
adding a predetermined addition value to a value of the power of the heat source when a molten pool state error is less than a predetermined threshold, and the output value of the power of the heat source is less than maximum power of the heat source, the molten pool state error being a difference between molten pool state target information and the molten pool state measurement information, the molten pool state target information being a targeted value of the state of the molten pool;
calculating the molten pool state error from an image of the state of the molten pool; and
adjusting the scanning speed of the heat source and the material feed speed on the basis of the molten pool state error, wherein
the output of the values of the power of the heat source, the scanning speed of the heat source, and the material feed speed, the addition of the predetermined addition value, the calculation of the molten pool state error, and the adjustment of the scanning speed of the heat source and the material feed speed are repeatedly performed until the power of the heat source reaches the maximum power of the heat source.

9. The control method for the additive manufacturing system according to claim 8, further comprising adding a scanning speed change amount to the scanning speed when the value of the scanning speed is less than a predetermined value, the scanning speed change amount being an amount of change in the scanning speed and being dependent on the addition value added to the power of the heat source.

10. The control method for the additive manufacturing system according to claim 9, wherein at a time of adding the scanning speed change amount to the scanning speed, a material feed speed change amount is added to the material feed speed, the material feed speed change amount being an amount of change in the material feed speed and being dependent on the scanning speed change amount.

11. The control method for the additive manufacturing system according to claim 9, wherein adding the scanning speed change amount includes calculating the scanning speed change amount, using a relationship determined in advance between the power of the heat source and the state of the molten pool and a relationship determined in advance between the scanning speed and the state of the molten pool.

12. The control method for the additive manufacturing system according to claim 10, wherein adding the scanning speed change amount includes calculating the material feed speed change amount, using the molten pool state measurement information, the scanning speed, and a geometrical shape of a corresponding one of the beads.

13. The control method for the additive manufacturing system according to claim 8, further comprising: causing the additive manufacturing system to operate using initial values predetermined as values of the power of the heat source, the scanning speed of the heat source, and the material feed speed at a start of building a first object layer formed of one of the beads, and adjusting at least one of: the power of the heat source; or the scanning speed of the heat source and the material feed speed, wherein when an object to build is changed, the method causes the additive manufacturing system to operate using values of an average heat source power, an average scanning speed, and an average material feed speed for an object layer built immediately before change, as values of the power of the heat source, the scanning speed of the heat source, and the material feed speed for use at a start of building an object layer after the change, and adjusts at least one of: the power of the heat source; or the scanning speed of the heat source and the material feed speed.

14. The control method for the additive manufacturing system according to claim 13, further calculating the values of the average heat source power, the average scanning speed, and the average material feed speed at a time of formation of a corresponding one of the beads of a single object layer.

* * * * *